PROTECTION OF SEMICONDUCTOR DEVICES

Filed June 2, 1952

INVENTORS.
LORNE D. ARMSTRONG
& JACQUES I. PANTCHECHNIKOFF
BY J. C. Whittaker
ATTORNEY

United States Patent Office 2,758,261

Patented Aug. 7, 1956

2,758,261

PROTECTION OF SEMICONDUCTOR DEVICES

Lorne D. Armstrong and Jacques I. Pantchechnikoff, now by change of name Jacques Isaac Pankove, Princeton, N. J., assignors to Radio Corporation of America, a corporation of Delaware

Application June 2, 1952, Serial No. 291,351

5 Claims. (Cl. 317—234)

This invention relates generally to semiconductor devices and more particularly to protecting the junctions of such devices.

Heretofore it has been found that the characteristics of some semiconductor devices are undesirably affected when encased or "potted" in certain low temperature setting plastic materials. Some of these devices suffer a decided loss in gain when encased in such materials. Apparently this loss in gain is attributable to a chemical reaction between the plastic and the portion of the device junction which is exposed on the semiconductor surface.

Also, certain plastics, upon setting, have a coefficient of expansion or contraction which is different from the coefficient of expansion or contraction of the semiconductive materials to which they are bonded. This results in stresses being set up within the semiconductors which may cause pushing or pulling of the terminal leads attached to, or in contact with, the junction material and result in the deformation thereof. A sufficient amount of deformation causes the effective barrier resistance between the junction material and the semiconductor undesirably to be reduced to extremely small values and may even result in a short circuit therebetween.

An object of the invention is to provide an improved semiconductor device.

Another object of the invention is to provide an improved method for protecting the junctions of semiconductive devices.

Another object of the invention is to provide a method for eliminating the chemical reaction occurring between the junction of a semiconductive device and the resin encasing the device.

A further object of the invention is to provide a method for reducing the intensity of mechanical stresses exerted on semiconductive devices by the material in which they are encased.

According to the present invention, the disadvantages heretofore mentioned are obviated by interposing a resilient material between the encasing material and the semiconductive device. The resilient characteristic of the interposed material transforms the stresses described above into hydrostatic forces which have no damaging effect upon the device. Also, the material utilized is selected such that it is substantially chemically inert and does not react chemically either with the "potting" material or with the junction, is selected to have high resistivity, and preferably also serves to protect the junction from moisture. In a modification of the basic form of the invention, an additional film or layer of material having predetermined light transmission, or rejection, characteristics is disposed intermediate the potting material and the resilient material. By suitably selecting the characteristics of this material, the device may be made insensitive to light rays or, alternatively, sensitive only to certain wave-lengths of lights such as infra-red rays.

Figure 1:
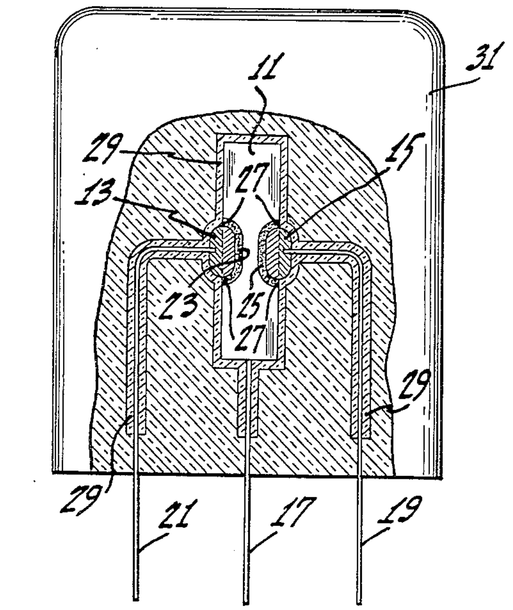
Figure 2:
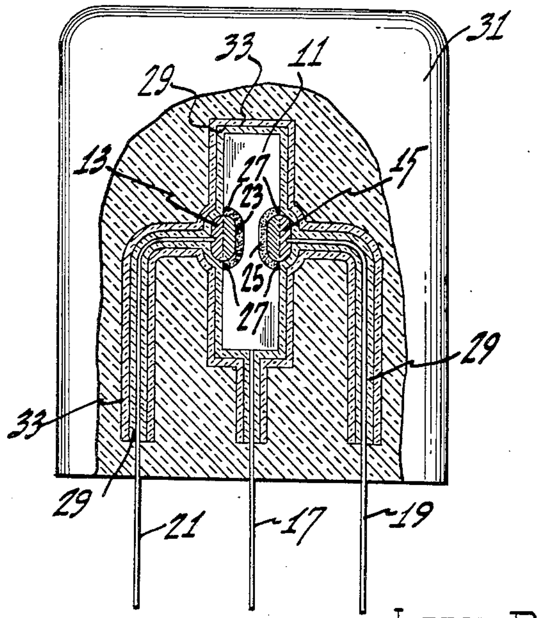

The invention will be described in greater detail with reference to the accompanying drawing in which:

Figure 1 is a schematic diagram of a semiconductive device, fabricated according to the invention; and Figure 2 is a schematic diagram of a modification of the basic embodiment of Figure 1.

Similar reference characters are applied to similar elements throughout the drawing.

Referring to Figure 1 of the drawing, a block of semiconductive material such as germanium, silicon, or the like is indicated at 11. In the present example it will be assumed that the material is germanium and is of N-type conductivity. Diffused into opposite faces of the germanium block 11 are pellets 13 and 15 of materials which as impurities in germanium give the latter P-type conductivity. Suitable materials yielding this conductivity characteristic include, by way of example, boron, indium, gallium, and aluminum. It is pointed out, however, that if it is desirable to utilize a P-type semiconductor block, the impurity diffusion materials are required to yield the opposite, or N-type, conductivity.

The above-mentioned diffusion may be achieved, for example, by the following method. Initially the block of germanium 11 is etched in a solution comprising 4 cc. of hydrofluoric acid, 2 cc. of concentrated nitric acid, and 200 milligrams of cupric nitrate in 4 cc. of water. After etching, the semiconductor is washed with distilled water at room temperature and dried in a blast of hot air, the air being at a temperature of approximately 60° C. A pellet of impurity material, such as shown at 13, is placed on one side of the germanium block 11 and the ensemble is heated in a reducing atmosphere at a temperature of approximately 200° C. for one minute so that the pellet "wets" the germanium. The remaining pellet 15 is then placed on the opposite face of the germanium block and the unit is heated in a reducing atmosphere at 400° to 500° C. for ten to twenty minutes whereby both pellets 13 and 15 are diffused into the germanium. The unit is then etched, for twenty seconds, in a solution of 56 cc. of concentrated hydrofluoric acid and 56 cc. of concentrated nitric acid in 30 cc. of triple-distilled water and subsequently is washed and dried. Terminal leads 17, 19 and 21 may then be soldered, or otherwise joined by well known techniques, to the block 11 and to the materials 13 and 15 respectively. For example, the leads 17, 19 and 21 may be coated with Wood's metal, pressed into the surfaces where contact is desired, and the unit heated to about 100° C. whereby the leads are suitably connected to the device.

As a result of the diffusion of atoms from materials 13 and 15, rectifying barriers 23 and 25, greatly exaggerated in size for purposes of illustration, are established at the junction of the pellet 13 to the block 11 and at the junction of the block 11 to the remaining pellet 15. As mentioned previously, the portions 27 of these junctions which are exposed at the surface of the block 11 undesirably react chemically with the "potting" materials. To obviate this condition, and for other reasons herein set forth, the assembled semiconductor unit is dipped in a protective solution such as polystyrene in toluol which, upon evaporation of the toluol, provides a chemically inert coating 29. The temperature of the solution should be low enough not to damage the junctions and preferably is less than 90° C. The depth of the coating 29 resulting from the dipping of the unit is not critical and, in a typical example, may be from 0.0005" to 0.010" thick. This coating "sets" to a resilient, rather than a hard, brittle film, without further heat or other treatment and the device then may be encased or molded in a potting material 31 which preferably is a thermoplastic resin which can be completely liquified and which has a melting point not higher than about 90° C. Examples of this type of resin are methacrylates, polyvinyl acetal resins, copolymers of polyvinyl chloride and polyvinyl acetate, polyvinyl acetate, and resins bearing the tradename Araldite.

These Araldite resins are a class of synthetic resins which may be derived by a number of processes one of which, for example, is described in U. S. Patent No. 2,324,483 granted to Pierre Castan wherein a polybasic carboxylic acid anhydride is condensed with the product of reaction, in alkaline solution, a polyhydroxy phenol and epichlorhydrine, the reaction product containing at least two ethylene oxide groups. The ethylene-oxide derivative and the acid anhydride may be either monomolecular or partially polymerised. Another process for preparing an Araldite resin is described in U. S. Patent No. 2,444,333 also granted to Castan. In this patent, an ethylene-oxide derivative containing at least two ethylene-oxide groups in the molecule is polymerised under the action of certain catalysers to produce hard and infusible resins.

In order that the semiconductive device may be operated at ambient temperatures and power levels which are higher than normal, a metallic oxide such as titanium dioxide which has sufficiently high electrical resistivity preferably is physically mixed with the potting resin within which the device is encased. The metallic oxide serves as a carrier to aid in dissipating the heat generated during the operation of the device while not affecting the electrical insulating characteristic of the resin.

While a solution of polystyrene in toluol has been described as utilized in the above example, other coating materials are suitable. Waxes such as paraffin wax, opal wax, and ceresin wax, and also petrolatum are typical examples of materials which have proved satisfactory. The criteria to be observed in selecting such coating materials are: (1) the coating material should not react chemically either with the junction or with the potting material, (2) it should be of high resistivity (of the order of $10^{15}$ to $10^{19}$ ohm-cm.), (3) it should be relatively soft and exhibit the characteristic of mechanical resilience, (4) it should have a high moisture rejection characteristic, and (5) a melting point not higher than approximately 90° C.

It is pointed out that it is not essential that the coating be applied by dipping the device in the protective solution. The protective coating also may be applied either by suitably painting or spraying the semiconductor device with the desired coating material. Moreover, it is only necessary to protect the critical portions 27 of the high resistance barriers 23 and 25. However, since the size of the device is extremely small, and since the exposed portions of the resistance barriers comprise a very small part of surface area of the device, it is relatively impractical to coat only these critical portions 27. Accordingly, the entire device preferably is coated as described in the process outlined above.

A modification of the basic form of the invention is shown in Figure 2. Referring to Figure 2, and after the protective coating 29 has been applied to the device and has "set," a second film or coating 33 is applied over the coating 29. This second coating 33 is selected to have a predetermined light transmission or rejection, characteristic. In the event that the semiconductive device is to be completely shielded from light rays, the material used may comprise, for example, well known commercial paints which are opaque to light, such as aluminum paint, consisting of an aluminum dispersion in a nitrocellulose lacquer, or highly resistive black paints such as those having a rubber base. This material also may be made by physically mixing suitable metallic oxides into a polystyrene-toluol solution, to render the mixture opaque upon drying. If it is desirable to allow certain wavelengths of light to affect or control the conductivity of the germanium, it will be seen that the coating 33 functions as a filter. The coating 33 may be applied to the device by dipping, painting, or spraying in much the same manner as discussed previously. In this instance, however, it is essential that the entire device be coated and not just certain specific areas thereof.

Devices fabricated in accordance with the foregoing examples have exhibited certain improved characteristics not present in devices of the prior art. First, no chemical reaction has been observed between the junctions of semiconductive devices and potting resins. Secondly, the resiliency of the protective coatings intermediate the resin and the junction relieves mechanical stresses normally present between the resin and the junction. Thirdly, the intermediate coating or coatings has the property of moisture rejection and thus reduces "wicking" action inherent in the resin. Lastly, the coating or coatings may be made opaque or selectively transmissive to light rays and thus afford a means for controlling the conductivity of the device.

While the invention has been described with reference to P–N junction type transistors, it is clear that the invention is equally applicable to point contact devices and to other devices wherein it is desirable mechanically, chemically, and electrically to protect such devices as herein taught.

What is claimed is:

1. A circuit element comprising a semiconductive device, a plastic material having metallic oxide mixed therewith for encasing said device, and a high resistivity resilient substantially chemically inert material in intimate contact with said device and said mixture for protecting predetermined portions of said device.

2. In a circuit element wherein a semiconductive device having a P-N rectifying junction at least partially exposed upon a surface thereof is encased within a thermoplastic resin having metallic oxide mixed therewith, the improvement comprising interposing a resilient high resistivity substantially chemically inert material between the P-N junction of said device and said resin, said material providing chemical and mechanical protection for said device and said P-N junction.

3. A circuit element comprising a semiconductive device, a substantially transparent plastic material for encasing said device, a high resistivity substantially chemically inert material adjacent said device and in contact with predetermined portions thereof, and a different material being substantially opaque intermediate said substantially inert material and said plastic material.

4. A circuit element comprising a semiconductive device having a P-N junction exposed on a surface thereof, a plastic insulating material having metallic oxide mixed therewith for encasing said device, and a resilient high resistivity substantially chemically inert material having a melting point not greater than approximately 90° centrigrade intermediate said device and said plastic material for protecting said P-N junction of said device.

5. A circuit element comprising a semiconductive device having a P-N junction exposed upon a surface thereof, a solid plastic body having metallic oxide mixed therewith encasing said device, and a thin film of a yieldable, high resistivity, chemically inert material interposed between said device and said plastic body and an auxiliary protective film surrounding and containing said thin film for protecting said device from mechanical shock and chemical reactions.

References Cited in the file of this patent

UNITED STATES PATENTS

| | | |
|---|---|---|
| 2,414,525 | Hill et al. | Jan. 21, 1947 |
| 2,548,353 | Cunningham | Apr. 10, 1951 |
| 2,628,271 | Brafman | Feb. 10, 1953 |
| 2,634,314 | Netherwood | Mar. 7, 1953 |
| 2,636,134 | Arons et al. | Apr. 21, 1953 |
| 2,669,635 | Pfann | Feb. 16, 1954 |
| 2,688,110 | Domaleski et al. | Aug. 31, 1954 |